United States Patent
Steinberger et al.

(10) Patent No.: US 9,890,816 B2
(45) Date of Patent: Feb. 13, 2018

(54) DAMPER ASSEMBLY INCLUDING A SPRING DAMPER TRANSFERRING TORQUE TO A SLIP CLUTCH

(71) Applicant: Schaeffler Technologies GmbH & Co. KG, Herzogenaurach (DE)

(72) Inventors: Markus Steinberger, Macedonia, OH (US); Matthew Payne, Glenmont, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 236 days.

(21) Appl. No.: 14/451,919

(22) Filed: Aug. 5, 2014

(65) Prior Publication Data

US 2015/0045124 A1  Feb. 12, 2015

Related U.S. Application Data

(60) Provisional application No. 61/862,713, filed on Aug. 6, 2013.

(51) Int. Cl.
| | |
|---|---|
| *F16F 15/123* | (2006.01) |
| *F16F 15/14* | (2006.01) |
| *F16D 7/02* | (2006.01) |
| *F16D 3/12* | (2006.01) |
| *F16D 3/14* | (2006.01) |

(52) U.S. Cl.
CPC ............ *F16D 7/02* (2013.01); *F16D 3/12* (2013.01); *F16D 7/025* (2013.01); *F16F 15/12353* (2013.01); *F16D 3/14* (2013.01); *F16D 2300/22* (2013.01); *F16F 15/145* (2013.01)

(58) Field of Classification Search
CPC ..... F16D 3/12; F16D 3/14; F16D 7/02; F16D 7/025; F16D 2300/22; F16F 15/123; F16F 15/1232; F16F 15/12323; F16F 15/1234; F16F 15/12353; F16F 15/13121; F16F 15/13164; F16F 15/134; F16F 15/1343; F16F 15/13469; F16F 15/13484; F16F 15/137; F16F 15/1421; F16F 15/1428; F16F 15/145; F16F 15/1457; F16H 45/02; F16H 2045/0221; F16H 2045/0226; F16H 2045/0231
USPC .... 464/45, 46, 68.1, 68.4, 68.41, 68.7, 68.8, 464/68.9, 68.92
See application file for complete search history.

(56) References Cited

U.S. PATENT DOCUMENTS

| | | | |
|---|---|---|---|
| 6,244,401 B1 * | 6/2001 | Maienschein | F16H 45/02 192/213.1 |
| 7,743,900 B2 * | 6/2010 | Breier | F16F 15/12373 192/212 |
| 7,993,206 B2 * | 8/2011 | Sugiyama | F16D 3/12 464/68.7 |
| 8,210,950 B2 * | 7/2012 | Nakagaito | F16F 15/129 464/46 |

(Continued)

*Primary Examiner* — Josh Skroupa
(74) *Attorney, Agent, or Firm* — Davidson, Davidson & Kappel, LLC

(57) ABSTRACT

A damper assembly for an engine includes a first spring damper connectable to a torque input component and a slip clutch connected to the first spring damper. The first spring damper transfers torque input to the first spring damper to the slip clutch. A hybrid motor vehicle drive train and a method of forming a damper assembly are also provided.

18 Claims, 2 Drawing Sheets

(56) References Cited

U.S. PATENT DOCUMENTS

| | | | |
|---|---|---|---|
| 8,628,425 B2* | 1/2014 | Sekine | F16F 15/1297 |
| | | | 464/46 |
| 9,151,332 B2* | 10/2015 | Jimbo | F16F 15/1397 |
| 9,163,712 B2* | 10/2015 | Gerdeman | F16H 45/02 |
| 2010/0032259 A1* | 2/2010 | Saeki | F16F 15/12366 |
| | | | 192/70.17 |
| 2010/0089046 A1* | 4/2010 | Tomiyama | F16H 45/02 |
| | | | 60/364 |
| 2010/0242466 A1* | 9/2010 | Krause | F16F 15/145 |
| | | | 60/327 |
| 2010/0269497 A1* | 10/2010 | Engelmann | F16F 15/145 |
| | | | 60/338 |
| 2011/0203895 A1* | 8/2011 | Degler | F16D 13/69 |
| | | | 192/70.11 |
| 2011/0287844 A1* | 11/2011 | Steinberger | F16F 15/13492 |
| | | | 464/68.8 |
| 2012/0152678 A1* | 6/2012 | Samie | F16H 45/02 |
| | | | 192/3.3 |
| 2013/0116054 A1 | 5/2013 | Amano et al. | |
| 2014/0041479 A1* | 2/2014 | Dinger | F16F 15/12353 |
| | | | 74/574.4 |

\* cited by examiner

DAMPER ASSEMBLY INCLUDING A SPRING DAMPER TRANSFERRING TORQUE TO A SLIP CLUTCH

This claims the benefit to U.S. Provisional Patent Application No. 61/862,713, filed on Aug. 6, 2013, which is hereby incorporated by reference herein.

The present disclosure relates generally to damper assemblies and more specifically to damper assemblies for use in hybrid motor vehicle drive trains.

BACKGROUND

U.S. Publication No. 2013/0116054 discloses a damping device for a hybrid application with a straight spring damper and a pendulum.

SUMMARY OF THE INVENTION

A damper assembly for an engine is provided. The damper assembly includes a first spring damper connectable to a torque input component and a slip clutch connected to the first spring damper. The first spring damper transfers torque input to the first spring damper to the slip clutch.

Embodiments of the damper may also include one or more of the following advantageous features:

The damper assembly may further include a drive component connected to the slip clutch and the torque may be transferred from the first spring damper through the slip clutch to the drive component. The damper assembly may further include a second spring damper connected to the drive component. The second spring damper may transfer the torque from the slip clutch to the drive component. The first spring damper may include arc springs and the second spring damper may include straight springs. The damper assembly may further include a pendulum absorber. The second spring damper may include a cover plate extending radially from the second spring damper to form an intermediate flange for the pendulum absorber. The first spring damper may include arc springs and a cover fixed to the torque input component. The cover may include a first radial extension surrounding a first side of the arc springs. The torque input component may be a flex plate and the first radial extension of the cover may be fixed to the flex plate by a connector passing through the flex plate. The flex plate may be connected to an engine crankshaft. The cover of the first spring damper may include a second radial extension surrounding a second side of the arc springs opposite the first side. The first radial extension and the second radial extension may circumferentially drive the arc springs. The first spring damper may include an output flange and the arc springs may circumferentially drive the output flange. The slip clutch may include a clutch plate and an elastic element circumferentially driven by the output flange. The elastic element may be loaded against the clutch plate. The slip clutch may include a reactor plate preloading the clutch plate against the elastic element. The damper assembly may further include a second spring damper including a cover plate and the clutch plate may be fixed to the cover plate.

A hybrid motor vehicle drive train is also provided. The drive train includes an engine; a hybrid transmission; and the damper assembly. The torque input component is fixed to the engine. The first spring damper transfers torque from the engine through the slip clutch to the hybrid transmission. The damper assembly may further include a second spring damper. The slip clutch may transfer torque from the engine to the hybrid transmission via the second spring damper.

A method of forming a damper assembly is also provided. The method includes providing a first spring damper connectable to a torque input component and connecting a slip clutch to the first spring damper such that the first spring damper transfers torque input to the first spring damper to the slip clutch.

Embodiments of the method may also include one or more of the following advantageous features:

The method may further include connecting a second spring damper to the slip clutch such that the slip clutch transfers torque input to the first spring damper to the second spring damper. The method may further include connecting a pendulum absorber to the second spring damper radially outside of the second spring damper. The method may further include connecting a drive component for driving a downstream transmission to the second spring damper. The first spring damper may include an output flange driven by springs of the first spring damper and the connecting the slip clutch to the first spring damper may include preloading the slip clutch against the output flange.

BRIEF DESCRIPTION OF THE DRAWINGS

The present invention is described below by reference to the following drawings, in which.

DETAILED DESCRIPTION

The present disclosure discloses a damper assembly, for use between an engine, in particular a three cylinder engine, and a hybrid transmission. The damper prevents the propagation of torque spikes and reduces rattle tendency if a traction motor deliver zero torque, for example if tires of the vehicle are slipping against a slick surface. Placing a slip clutch after an arc spring damper may improve controllability of the slip clutch. A pendulum absorber disposed in a torque path between the arc spring damper and a second, straight spring damper may further improve isolation. A stud fixed to an outer cover of the arc spring damper may reduce axial space.

Figure 1:
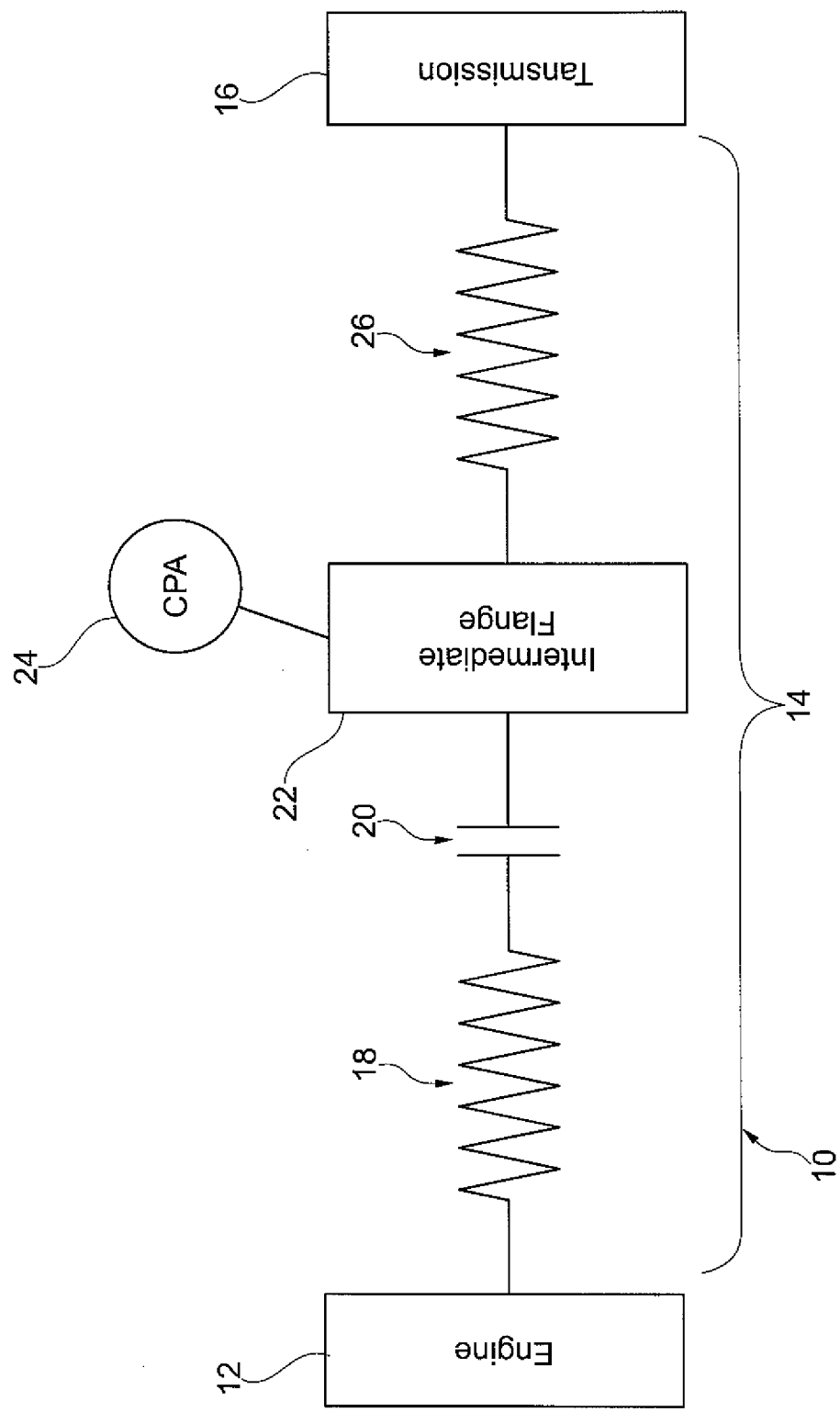
FIG. 1 schematically shows a drive train for a hybrid motor vehicle in accordance with an embodiment of the present invention.

FIG. 1 schematically shows a drive train 10 for a hybrid motor vehicle. Drive train 10 includes an engine 12, which in a preferred embodiment is a three cylinder engine, a damper assembly 14 connected to a crankshaft of engine 12 and transmission 16, which in a preferred embodiment is a hybrid transmission, downstream of damper assembly 14. Damper assembly 14 transfers torque from engine 12 to transmission 16. Damper assembly 14 includes several technologies which provide engine vibration isolation and torque spike limitation without limiting performance and efficiency of drive train 10. As shown schematically in FIG. 1, damper assembly 14, in the direction of the torque path from engine 12, includes a first spring damper 18, an overload or slip clutch 20, an intermediate flange 22 connected to a centrifugal pendulum absorber 24, and a second spring set 26, which is connected to transmission 16.

Figure 2:
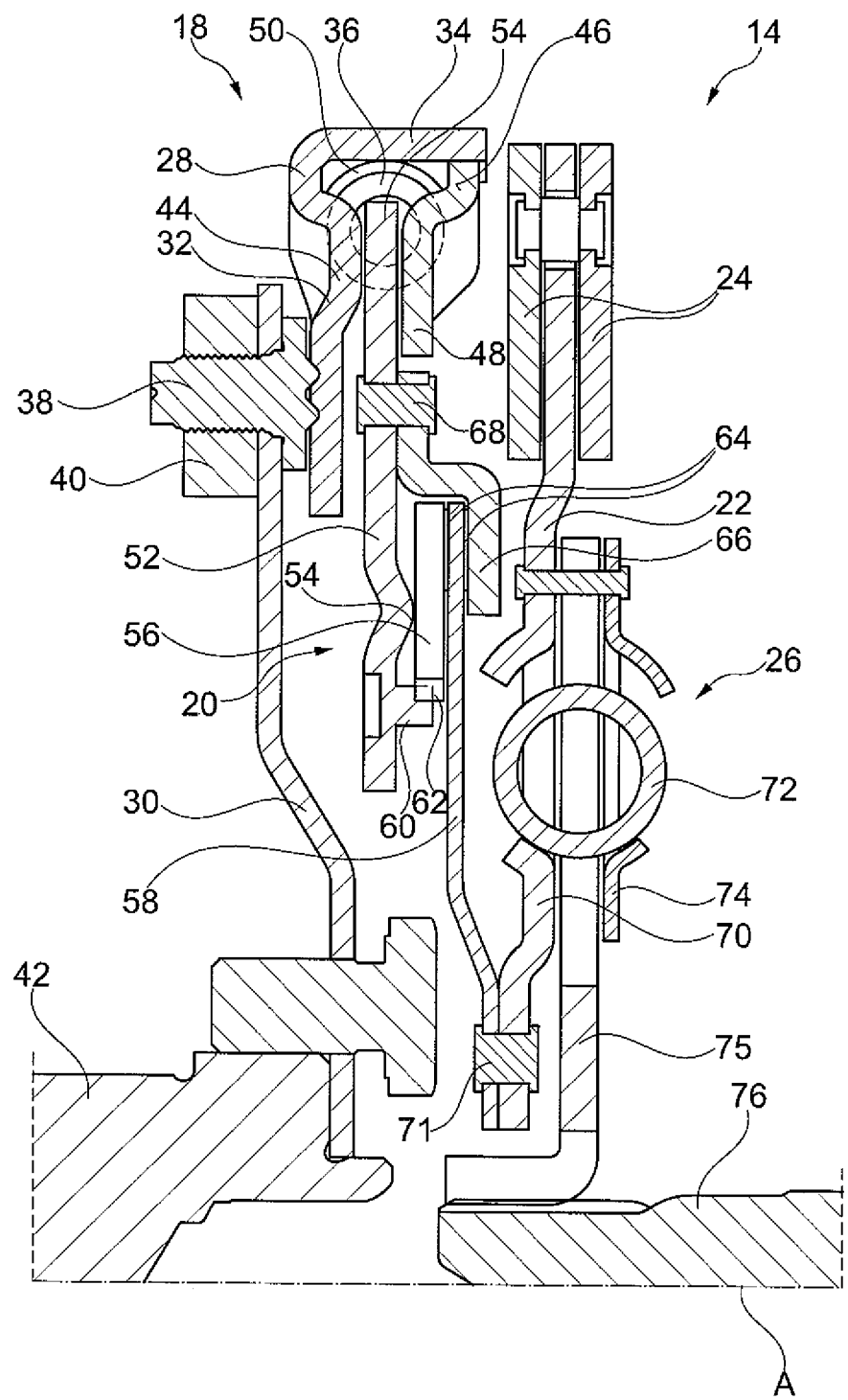
FIG. 2 shows a cross-sectional view of a damper assembly of the drive train in accordance with an embodiment of the present invention.

FIG. 2 shows a cross-sectional side view of damper assembly 14 in accordance with an embodiment of the present invention. First spring damper 18 includes an outer cover 28 that is connected to a torque input component, which is in the form of a flex plate 30. Outer cover 28 includes a first radial extension 32 extending radially away from a center axis A of damper assembly 14, an axial extension 34 extending axially from an outer radial end of first radial extension 32 and a second radial extension 46 extending radially from an axial end of axial extension 34. Flex plate 30 is fixed to first radial extension 32 of outer cover 28 by a stud 38 that is fixed to an outer surface of first radial extension 32 and passes through a hole formed in flex plate 30. A threaded lug 40 is provided on threads of stud 38 at an outer surface of flex plate 30 to secure flex plate 30 to stud 38 and form a connector connecting flex plate 30 to outer cover 28. Flex plate 30 is fixed to a crankshaft 42 of engine 10 such that flex plate 30 transfers torque from engine 10 to first spring damper 18.

First spring damper 18 also includes a plurality of arc springs 36 spaced circumferentially about axis A. First radial extension 32 of outer cover 28 includes first spring engagers 44 that axially protrude from first radial extension 32 away from flex plate 30 into the circumferential spaces between arc springs 36. Circumferentially between first spring engagers 44, first radial extension 32 of outer cover 28 surrounds a first side of arc springs 36. Second radial extension 46 of outer cover 28 surrounds a second side of arc springs 36 opposite the first side. Second radial extension 46 also includes spring engagers 48, which axially protrude from second radial extension 46 toward flex plate 30 into the circumferential spaces between arc springs 36 such that spring engagers 44, 48 are configured for circumferentially driving arc springs 36 by transferring torque from flex plate 30 to arc springs 36. An arc-shaped guide shell 50 is positioned between radial portions of arc springs 36 and axial extension 34.

First spring damper 18 also includes an output flange 52 having tabs 54 extending radially away from axis A into the circumferential spaces between arc springs 36 such that output flange 52 is circumferentially driven by arc springs 36. Output flange 52 connects first spring damper 18 to slip clutch 20 and transfers torque from first spring damper 18 to slip clutch 20. Output flange 52 includes a loading protrusion 54 that extends away from flex plate 30 for loading an elastic element of slip clutch 20, which is in the form of a diaphragm spring 56, against a clutch plate 58 of slip clutch 20. Output flange 52 also includes an axial extension 60 for supporting and circumferentially driving diaphragm spring 56 via an inner radial surface 62 of diaphragm spring 56. Clutch plate 58 includes friction material 64 bonded to both sides thereof for engaging diaphragm spring 56 and a reactor plate 66 which is connected to output flange 52 by a rivet 68. Reactor plate 66 preloads clutch plate 58 against diaphragm spring 56 such that clutch plate 58 and diaphragm spring 56 are sandwiched between output flange 52 and reactor plate 66. Grease is placed on friction surfaces the of friction material 64 on both sides of clutch plate 58 to provide a stable friction coefficient over the life damper assembly 14.

An inner radial end of clutch plate 58 is connected to an inner radial end of intermediate flange 22, which forms a first cover plate 70 of second spring damper 26, by a rivet 71 so as to connect slip clutch 20 to second spring damper 26 such that slip clutch 20 transfers torque to second spring damper 26. Thus, first spring damper 18 and second spring damper 26 are arranged in series so as to provide a low overall spring rate. Second spring damper 26 includes a plurality of straight springs 72 circumferentially spaced about axis A that are held between first cover plate 70 and a second cover plate 74. A radial outer end of intermediate flange 22 extends radially outward from second spring damper 26 to support centrifugal pendulum absorber 24. This arrangement isolates centrifugal pendulum absorber 24 between first spring damper 18 and second spring damper 26, providing an optimal location for centrifugal pendulum absorber 24. The arrangement of stud 38 and lug 40 on the outer surface of damper assembly 14 allows second spring damper 26 to take up space that would otherwise be required for crank bolt access holes, which in turn allows sufficient radial space from centrifugal pendulum absorber 24.

Second spring damper 26 is connected to a drive component in the form of a secondary flange 75. Secondary flange 75 receives the torque from second spring damper 26 and transfers the torque to an output shaft 76, which transfers torque to transmission 16.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A damper assembly for an engine comprising:
    a connector;
    a first spring damper fixed to the connector, the first spring damper being connectable to a flex plate by the connector, the first spring damper including an output flange, first springs and a cover configured for driving the first springs, the first springs arranged for circumferentially driving the output flange, the connector being fixed to the cover such that torque is inputtable from the flex plate first to the connector, then from the connector through the first springs and then to the output flange;
    a slip clutch connected to the first spring damper; and
    a second spring damper including second springs and a cover plate supporting the second springs, the slip clutch including a clutch plate, the clutch plate arranged for transferring torque from the output flange to the cover plate, the clutch plate being fixed to the cover plate by a fastener.

2. The damper assembly as recited in claim 1 further comprising a drive component connected to the slip clutch, the torque being transferred from the first spring damper through the slip clutch to the drive component.

3. The damper assembly as recited in claim 2 wherein the second spring damper is connected to the drive component, the second spring damper arranged for transferring the torque from the slip clutch to the drive component via the second springs.

4. The damper assembly as recited in claim 3 wherein the first springs are arc springs and the second springs are straight springs.

5. The damper assembly as recited in claim 3 further comprising a centrifugal pendulum absorber, the cover plate extending radially outward from the second spring damper to form an intermediate flange for the centrifugal pendulum absorber.

6. The damper assembly as recited in claim 1 wherein the cover includes a first radial extension surrounding a first side of the first springs.

7. The damper assembly as recited in claim 6 wherein the connector is fixed to the first radial extension of the cover and the first radial extension of the cover is fixable to the flex plate by passing the connector through the flex plate.

8. The damper assembly as recited in claim 7 wherein the flex plate is connected to an engine crankshaft.

9. The damper assembly as recited in claim 6 wherein the cover of the first spring damper includes a second radial extension, the second radial extension surrounding a second side of the first springs opposite the first side, the first radial extension and the second radial extension circumferentially driving the first springs, a radially outer end of the output flange being axially between the first radial extension and the second radial extension.

10. The damper assembly as recited in claim 1 wherein the slip clutch includes an elastic element circumferentially driven by the output flange, the elastic element being loaded against the clutch plate by the output flange.

11. The damper assembly as recited in claim 10 wherein the slip clutch includes a reactor plate preloading the clutch plate against the elastic element, the clutch plate being sandwiched axially between the reactor plate and the elastic element.

12. A hybrid motor vehicle drive train comprising:
an engine;
a hybrid transmission; and
the damper assembly as recited in claim 1, the flex plate being fixed to the engine, the first spring damper transferring torque from the engine through the slip clutch to the hybrid transmission.

13. The hybrid motor vehicle drive train as recited in claim 12 wherein the slip clutch is configured for transferring torque from the engine to the hybrid transmission via the second spring damper.

14. A method of forming a damper assembly comprising:
providing a first spring damper fixed to a connector, the first spring damper being connectable to a flex plate by the connector, the first spring damper including an output flange, first springs and a cover configured for driving the first springs, the first springs arranged for circumferentially driving the output flange, the connector being fixed to the cover such that torque is inputtable from the flex plate first to the connector, then from the connector through the first springs and then to the output flange;
connecting a slip clutch to the first spring damper; and
fixing a clutch plate of the slip clutch to a cover plate of a second spring damper by a fastener, the second spring damper including second springs supported by the cover plate, the clutch plate being arranged for transferring torque from the output flange to the cover plate.

15. The method as recited in claim 14 further comprising connecting a centrifugal pendulum absorber to the clutch plate, the cover plate forming an intermediate flange of the centrifugal pendulum absorber, the centrifugal pendulum absorber being radially outside of the second springs.

16. The method as recited in claim 14 further comprising connecting a drive component for driving a downstream transmission to the second spring damper.

17. The method as recited in claim 14 wherein the connecting the slip clutch to the first spring damper includes preloading the slip clutch against the output flange.

18. A damper assembly for an engine comprising:
a connector;
a first spring damper fixed to the connector, the first spring damper being connectable to a flex plate by the connector, the first spring damper including an output flange and first springs, the first springs arranged for circumferentially driving the output flange;
a slip clutch connected to the first spring damper; and
a second spring damper including second springs and a cover plate supporting the second springs, the slip clutch including a clutch plate, the clutch plate arranged for transferring torque from the output flange to the cover plate, the clutch plate being fixed to the cover plate by a fastener,
wherein the first spring damper includes a cover fixable to the flex plate, the cover including a first radial extension surrounding a first side of the first springs,
wherein the cover of the first spring damper includes a second radial extension, the second radial extension surrounding a second side of the first springs opposite the first side, the first radial extension and the second radial extension circumferentially driving the first springs, a radially outer end of the output flange being axially between the first radial extension and the second radial extension.

* * * * *